United States Patent [19]

Mylander

[11] Patent Number: 4,522,227

[45] Date of Patent: Jun. 11, 1985

[54] FILL VALVE RESPONSIVE TO LIQUID LEVEL

[76] Inventor: Gerald D. Mylander, 22486 Alcudia, Mission Viejo, Calif. 92692

[21] Appl. No.: 493,259

[22] Filed: May 10, 1983

[51] Int. Cl.³ .............................................. F16K 21/18
[52] U.S. Cl. ................................... 137/393; 137/158; 137/505.13; 141/198; 141/215; 141/302; 251/25
[58] Field of Search ............... 137/158, 386, 390, 393, 137/625.6, 505.13, 519, 532, 534; 141/192–229, 301–306, 95; 251/25, 36, 50, 51

[56] References Cited

U.S. PATENT DOCUMENTS

| | | | |
|---|---|---|---|
| 1,302,538 | 5/1919 | Gulick | 251/45 |
| 1,485,959 | 3/1924 | Brown | 137/505.13 |
| 2,571,433 | 10/1951 | Fine et al. | 137/505.13 |
| 2,590,622 | 3/1952 | Huber | 137/505.13 |
| 3,363,641 | 1/1968 | Mylander | 137/393 |
| 4,191,208 | 3/1980 | Mylander | 137/393 |
| 4,393,891 | 7/1983 | Snoek et al. | 137/505.13 |
| 4,405,000 | 9/1983 | Fuller | 137/393 |

Primary Examiner—George L. Walton
Attorney, Agent, or Firm—Allen A. Dicke, Jr.

[57] ABSTRACT

The fill valve is responsive to liquid level by passing vented vapor through serial orifices. The inlet flow is stopped by shifting a valve spool which is responsive to the pressure between the orifices. A pressure booster adjacent the vent outlet serves to momentarily shut off the outlet when pressure rises in the region of the second orifice to aid in shifting the main valve spool when system pressure is low.

15 Claims, 2 Drawing Figures

FILL VALVE RESPONSIVE TO LIQUID LEVEL

BACKGROUND OF THE INVENTION

This invention is directed to a fill valve which is responsive to liquid level and is particularly suitable for stopping the filling of liquid propane tank and other liquid petroleum gas tanks when the liquid level therein reaches a predetermined fill point to prevent tank overfilling.

Liquefied petroleum gas, including propane, butane and mixtures thereof with other gases of similar nature, is extensively used for household cooking and heating where natural gas is unavailable. Furthermore, liquefied petroleum gas is used for these purposes on recreational vehicles. Liquefied petroleum gas is extremely volatile and burns readily. In the liquefied state, the vapor pressure of propane and butane is such that the liquid can be stored in tanks of only moderate strength in outdoor locations at the ambient temperatures encountered. These characteristics make liquefied petroleum gas extremely desirable for use as fuels.

Liquid petroleum gases have extremely high thermal coefficients of expansion, such that even moderate changes in temperature thereof may cause the liquid to expand or contract appreciably. For this reason, it is necessary to maintain a head space in a tank where the liquefied petroleum gas is stored. A portion of the volume of any such tank must be left unoccupied with liquid to allow for expansion upon increase in temperature.

The most common present device for determining maximum tank fill comprises a liquid-sensing dip tube which extends down into the tank to the point of highest proper liquid level in the tank. The dip tube vents outside the tank and has a manual valve thereon. The manual valve is opened, and filling is commenced. Vapor from the tank head space is discharged out of the open manual valve and, when the tank is filled with liquid to the bottom of the dip tube, the liquid level is sensed thereat by the liquid discharging from the manual vent valve. The liquid expands and vaporizes as it reaches the atmosphere, thus creating a telltale white cloud. When seeing such a cloud, the operator shuts off the fill valve and terminates the filling operation.

To reduce reliance upon the operator, it is desirable that an automatic fill-stop valve is required. The present inventor, Gerald D. Mylander, has previously invented the subject matter of U.S. Pat. No. 3,363,641 which is responsive to the liquid level so that tank filling is stopped when the desired level is reached. That structure is arranged so that both the filling flow and its level-sensing flow are automatically shut off. In addition, he has invented an automatic fill-stop valve, as shown in U.S. Pat. No. 4,191,208 which is of simpler construction, but has features therein which increase the reliability of shifting of the main valve spool for shutoff of in-flowing liquid.

The vapor pressure over the liquid petroleum gas and its vapor in a tank at outdoor temperatures above freezing is adequate to reliably shift the main shutoff valve spool. However, when the temperature is low, for example in the order of 20 degrees F., the vapor pressure is too low for reliable operation. Under low temperature conditions, the automatic fill-stop valve shown in U.S. Pat. 4,191,208 does shift, but the reliability can be enhanced by providing a pressure booster which momentarily provides an increase in pressure in the volume which acts upon the main shutoff spool to urge it in the closing direction.

SUMMARY OF THE INVENTION

In order to aid in the understanding of this invention, it can be stated in essentially summary form that it is directed to a fill valve responsive to liquid level wherein serial orifices pass outflow from a tube inlet positioned adjacent the top of a tank to be filled, and the pressure between the serial orifices supplies the drive chamber pressure which closes the main filling valve. An orifice subsequent to the drive chamber is equipped with a pressure booster which momentarily increases the pressure in the drive chamber upon flow of liquid through the first orifice by blocking flow to atmosphere.

It is, thus, an object of this invention to provide a fill valve which is responsive to liquid level which stops the filling of a liquefied petroleum gas tank when the liquid level has reached a predetermined point. It is a further object to provide a fill valve responsive to liquid level which has a manual vent valve for controlling the flow of vapor from the head space in the tank so that the fill valve is shut off when liquid is sensed in the manually controlled level-sensing line. It is another object to provide a pressure booster adjacent the outlet of the level-sensing line to provide a boosted pressure for reliably shutting off flow even at low tank temperatures.

Other objects and advantages of this invention will become apparent from a study of the following portion of the specification, the claims and the attached drawings.

DESCRIPTION OF THE PREFERRED EMBODIMENT

Figure 1:
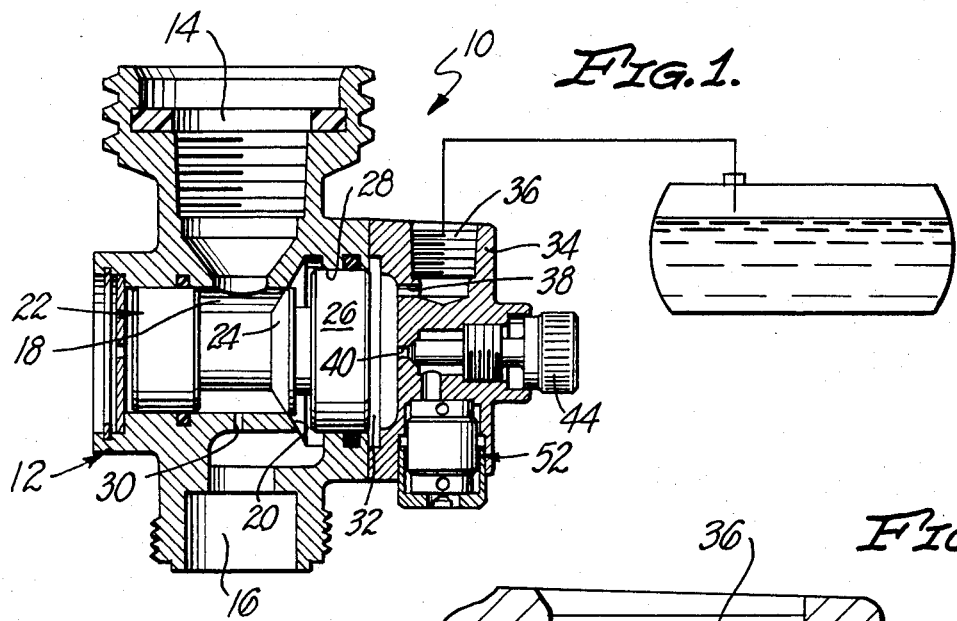
FIG. 1 is a longitudinal section through a fill valve responsive to liquid level in accordance with this invention, very similar to FIG. 2 in U.S. Pat. No. 4,191,208, with the bonnet turned 90 degrees so that it is similar to the section through the bonnet in FIG. 3 of that patent.

The fill valve of this invention is generally indicated at 10 in FIG. 1. Valve 10 is particularly suited to be installed in a tank, as is shown in Mylander U.S. Pat. Nos. 3,363,641 and 4,191,208, the entire disclosure of which is incorporated herein by this reference. Valve 10 has a body 12 which has an inlet port 14 and an outlet port 16. The inlet port 14 is provided within a neck which has exterior threads thereon onto which a filling hose can be connected. Outlet port 16 is within a neck which is externally threaded to be attached into an inlet boss on the top of a tank. Inlet port 14 is connected into the side of cross bore 18. Cross bore 18 is provided with a valve seat 20, and the space immediately to the right of the valve seat is connected to outlet port 16. Valve spool 22 is positioned within valve cross bore 18 for sliding in the right-hand direction, as seen in FIG. 1. Valve disc 24 is formed on the valve spool 22 so that it engages against valve seat 20 with the valve spool in the leftward position, as shown in FIG. 1. In this position, the valve is closed off. The piston on the left end of the spool has the same area facing the inlet pressure when the valve is closed in the position shown in FIG. 1 so the valve is balanced on that end. The left end of spool 22 is vented to atmosphere. Spool 22 carries piston 26 on its right hand. Piston 26 acts within bore 28, which is larger than valve cross bore 18. Equalizer channel 30 equalizes the pressure across valve disc 24 when conditions are static. The right side of piston 26 faces control chamber 32 under bonnet 34.

Figure 2:
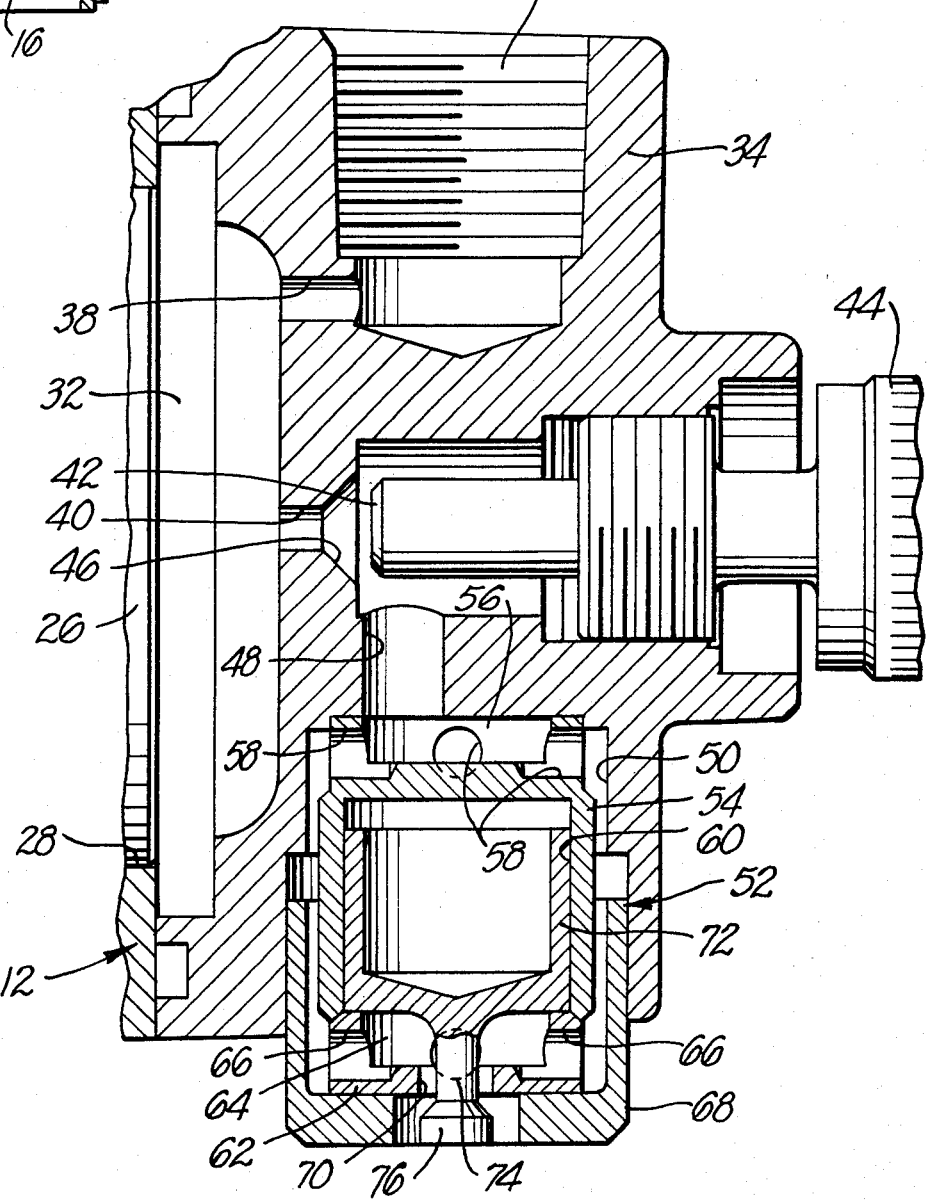
FIG. 2 is an enlarged section through the bonnet of the fill valve in accordance with this invention, along generally the same section line as FIG. 1, and showing the pressure booster in the outlet of the level-sensing line.

Bonnet 34 is connected to control the pressure on piston 26 to move the piston to the left and close the valve when the liquid level in the tank reaches the level of the dip tube. Referring to Mylander U.S. Pat. No. 4,191,208, when the top 28 of the liquid reaches the bottom of level-sensing tube 26 due to filling liquid into the tank, liquid instead of vapor is driven up through the level-sensing tube 26. An orifice 25 of 0.055 inch or 1.4 millimeters is formed in the boss of the tank to limit outflow. Orifice 25 is the first orifice in the series. Tube 92 connects the flow to the sensing inlet port 36, in the present FIGS. 1 and 2, in bonnet 34. Sensing inlet 36 is connected into control chamber 32 through port 38, which is not an orifice. The outlet from control chamber 32 is orifice 40, with which is associated needle valve 42. Needle valve 42 has a manual knob 44 which permits manual opening and closing of needle valve 42 with respect to seat 46 associated with orifice 40. When needle valve 42 is opened in the position shown in FIG. 2, flow is through port 48 into chamber 50 which, at its lower end in FIG. 2, is directed to atmosphere.

Pressure booster 52, in accordance with this invention, is positioned in chamber 50. Pressure booster 52 is arranged to provide a pressure pulse in chamber 32 to help spool 22 to move to the left to the closed position when liquid is sensed in the sensing tube.

Cup 54 rests in the bottom of chamber 50. It has an inlet recess 56 facing port 48 and cross holes 58 into the inlet recess which provide open channels into chamber 50. Cup 54 has an interior cylinder bore 60, and covering the cylinder bore is cap 62. Cap 62 has a recess 64 facing cylindrical bore 60 and has cross holes 66 which permit communication of the fluid to the downwardly facing open end of cylinder bore 60.

Cover 68 is retained in chamber 50, such as by pressfit. Cover 68 engages on cap 62 which, in turn, engages on cup 54 so that the cap and cup are held in position in chamber 50. Outlet flow from cap 62 is through outlet opening 70 in the center thereof.

Piston 72 is positioned in cylinder bore 60. On its lower end, as seen in FIG. 2, it carries valve spool 74 which has land 76 thereon. Most of pressure booster 52 is cylindrically symmetrical about an upright axis in the plane of the paper, and piston 72 is slidable within its bore 60 from the lower position illustrated in FIG. 2 to an upper position. In the upper position, piston 72 is bottomed in the upper end of bore 60 and land 76 is positioned in outlet opening 70. Land 76 forms a fairly good fit within outlet opening 70 so that the outlet changes from an unrestricted outlet to an orifice.

In reviewing operation, in the initial condition it is assumed that the valve 10 is in the quiescent, non-filling state. In this condition, there is some liquid in the tank but the level of the liquid is below the bottom of the level-sensing tube within the tank. Considering the forces on valve spool 22, the left end is open to the atmosphere. Using atmospheric pressure as reference zero, that area does not apply force to the valve spool 22. The left face of large piston 26 is larger than the right face of the small piston at the left end of the valve spool 22. Since those faces are at tank presure by virtue of equalizer channel 30, the force of tank presure times the differential area urges the spool to the right, toward the open position. The amount of closing force produced by the pressure in control chamber 32 times the area on the right of piston 26 determines the valve motion and position. In the initial condition, vent valve 42 is closed and a cap closes inlet port 14. In this no-flow condition, the pressure of the tank is communicated to control chamber 32 through the level-sensing tube, through the orifice associated therewith, and through the line connected to sensing inlet 36. With tank pressure communicated to control chamber 32, there is a net force urging valve spool 22 to the left, closed position shown in FIG. 1.

When the tank is to be filled, the cap is removed from inlet port 14 and a filling line is connected thereto. Liquefied petroleum gas is supplied under pressure to inlet port 14. However, in view of the pressures applied to valve spool 22, this spool remains in the leftward, closed position. When the filling attendant manually opens vent needle valve 42, vapor flow passes through the first orifice on the tank into control chamber 32, thence through second orifice 40, and with piston 72 in the lower position illustrated, out of outlet opening 70. Due to the relative sizes of second orifice 40 and outlet opening 70 in its open position, the pressure does not substantially rise in recess 64. However, the fit of piston 72 within bore 60 is sufficiently loose that, in a short time (in less than 5 seconds), the pressure within cup 54 is substantially equalized with the pressure in recess 64.

When vent needle valve 42 is opened, flow through the orifices is such that the pressure in control chamber 32 drops to about 20 percent of tank pressure. In this condition, the tank pressure acts upon the differential areas on valve spool 22 and the spool moves to the right, open position so that tank filling proceeds.

When the top of the liquid in the tank rises to the bottom of the level-sensing tube, the liquid passes up through the level-sensing tube, through the orifice associated therewith and into control chamber 32. When liquid reaches orifice 40, there is a rise in pressure within control chamber 32. At normal ambient temperature, this rise in pressure is sufficient to shift the valve spool to the left to shut off filling. However, when temperatures are low, the tank pressure is low and the pressures acting on the differential areas may not be sufficient to reliably shift spool 22 to the closed position.

It is in this condition that pressure booster 52 is functionally operative. As the liquid passes through the various ports and channels of the pressure booster, when it reaches outlet opening 70, it produces an increase in pressure in recess 64. This recess is a large active area against the under side of piston 72. The upper side of piston 72 is still at a much lower pressure, just above atmospheric, which it obtained when vapor was passing through the ports and orifices. The increase in pressure in recess 64 drives piston 72 to its upper position wherein outlet opening 70 is substantially closed. The substantial closing of this third orifice provides a pressure pulse returning upward through the liquid column, and this pressure pulse and its associated increase in pressure acts in control chamber 32 to drive spool 22 to the left. The pulse overcomes the friction of spool 22 so that it can now readily move onto its closed position on its low differential forces.

With the valve spool 22 in the left, closed position and liquid flowing through the sensing system in the bonnet in control chamber 32, the liquid pressure in control chamber 32, on the right end of piston 26, is sufficiently high to provide a differential force to hold the spool in the closed position.

It is seen that, in the preferred embodiment, there are three orifices in series. The first orifice is affixed to the tank, as required by ASME code. The second orifice is orifice 40; and the relative sizes of the first and second orifices provide the pressure in control chamber 32, in the preferred embodiment described above. However, the third orifice 70, in the open position, can share the vapor pressure drop with orifice 40. Furthermore, instead of the orifice being provided at 40, a port could be provided such that there is little pressure drop therethrough. In that case, outlet opening 70 would be the orifice which acts with the first orifice to provide the control of pressure in control chamber 32. In other words, the amount of pressure drop between the second orifice 40 and the third orifice 70 can be adjusted therebetween.

Piston 72 has a larger area at the top than at the bottom, and in constant pressure conditions, the pressure both above and below the piston is the same. With a larger area on the top and when the pressure is equalized, the piston is in the lower position shown. However, when there is a fairly rapid increase in pressure in recess 64, this increased pressure acts against the smaller, lower end area of piston 72 and, when the pressure increases 25 enough and quickly enough, it overcomes the downward force on the piston due to pressure within cup 54 so that the piston thus rises decreasing the opening in third orifice 70. As previously stated, this increases pressure in control chamber 32 to reliably rest spool 22 to the left, closed position. However, piston 72 remains in the raised position only a short time. Since the pressure below piston 72 is higher than the pressure within cup 54, there is upward flow into the cup. This upward flow raises the pressure in the cup until the effect of the differential area is overcome and piston 72 moves downward. Thus, pressure booster 52 is a momentary device which produces a pressure pulse and a pressure rise in control chamber 32 sufficiently long to overcome the friction of spool 22 and move it to the left. When piston 72 moves to its lower, open position illustrated in FIG. 2, it is again ready for further use.

As the final steps, the operator manually closes vent needle valve 42 to stop the flow through the sensing system to the atmosphere. He removes the filling nozzle and replaces the cap on the inlet port 14 of valve 10. The system is now returned to the original condition with the tank safely filled.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fill valve responsive to liquid level, said fill valve being connectable into a system between a supply and a tank to control the filling of the tank, said fill valve having a body and a passage through said body through which a compressible fluid passes to fill the tank, a valve in said body to close the passage through said body to cut off filling of the tank;

a control chamber within said body and pressure-responsive means adjacent said control chamber and connected to said valve for closing said valve upon adequate increase in pressure in said control chamber;

at least first and subsequent serially connected orifices, with said control chamber connected between said first and subsequent orifices, said first orifice being connectable to a liquid level-sensing tube in a tank and said subsequent orifice being for discharge to atmosphere so that the pressure in said control chamber is a function of the pressure and liquid or vapor state of the compressible fluid flowing through the first orifice; and a pressure booster in association with said subsequent orifice, said pressure booster comprising a cylinder having a head end and a piston within said cylinder defining a head end space for receiving the compressible fluid, a valve spool on said piston away from said head end of said cylinder, a land being disposed at a lower end on said valve spool, said land coacting with said subsequent orifice to decrease the open area of said subsequent orifice when said pressure booster piston moves toward the head end of its cylinder, a restricted fluid passage between said booster piston and said cylinder and between the land side and cylinder head side of said booster piston, said booster piston being without the necessity of spring bias because of the compressibility of the fluid within the head end space so that its position is controlled by the pressure within the head end space and the pressure on the valve spool so that when pressure rises rapidly in said control chamber, said pressure booster piston moves without the need for any dampening effect and automatically increases restriction in said subsequent orifice to further automatically raise the pressure in said control chamber to reliably shift said valve spool and automatically reopens thereafter without requiring change in the control chamber pressure.

2. The fill valve of claim 1 wherein said pressure booster piston has a pressure-sensing side thereof facing a flow passage of fluid from said control chamber to said subsequent orifice.

3. The fill valve of claim 2 wherein as said piston moves to a higher sensed pressure position, said land moves into said subsequent orifice to restrict flow therethrough and raise pressure in said control chamber.

4. The fill valve of claim 3 wherein said head side of said piston has a larger effective area than said spool-carrying pressure-sensing side of said piston, and said restricted fluid passage is around said piston so that fluid flow through said restricted passage ultimately equalizes pressure between said sides of said piston.

5. The fill valve of claim 4 wherein said pressure booster includes a cup therein with a cylindrical bore within said cup, said piston acting with said cylindrical bore, a cover on said cup, said cover having said subsequent orifice therein.

6. A fill valve responsive to liquid level, comprising:

a body having a flow passage therethrough and having a control chamber therein, a valve associated with said control chamber such that when pressure sufficiently rises in said control chamber, said valve is closed to stop a compressible fluid flow therethrough, said valve body being for use in filling a fluid tank having a level-sensing tube therein and a first orifice connected to the tank and with flow from the first orifice conducted to said control chamber;

a pressure booster, said pressure booster having a second orifice therein, said control chamber being connected so that the pressure in said control chamber is a function of tank pressure and the fluid flow through the orifices, and the pressure in said control chamber rises when liquid instead of vapor flows through the first orifice, said pressure booster comprising a cylinder having a head end and a piston within said cylinder defining a head end space for receiving the compressible fluid, a valve spool on said piston away from said head end of said cylinder, a land on said valve spool, said land coacting with said second orifice to decrease the open area of said second orifice when said pressure booster piston moves toward the head end of its cylinder, a restricted fluid passage between said booster piston and said cylinder and between the land side and the cylinder head end side of said booster piston, said land side of said piston having less effective area than the head side thereof facing said head end space which allows the compressible fluid within said head end space to be compressed so that the position of said piston is controlled by a surge of pressure within the head end space and the pressure on the valve spool so that said booster piston is away from the head end of its cylinder when pressure is substantially constant said pressure booster thus being responsive to an increase in pressure in said control chamber so that its piston moves without the need for any dampening effect and toward its head end so that said second orifice is automatically restricted when pressure suddenly rises in said control chamber to restrict flow from said second orifice and cause a further increase in pressure in said control chamber to reliably actuate said fill valve.

7. The fill valve of claim 6 wherein said land is in a position away from said orifice when said piston is in an unactuated position and is adjacent said second orifice to reduce the effective flow area therethrough when said piston is in its actuated position.

8. The fill valve of claim 7 wherein one side of said piston is connected to be acted upon by pressure related to the pressure in said control chamber.

9. The fill valve of claim 8 wherein said side of said piston acted upon pressure related to pressure in said control chamber is the valve side of said piston and carries said valve spool and said land thereon.

10. The fill valve of claim 9 wherein the side opposite said valve side of said piston is the head side of said piston and said head side of said piston faces into a closed cylinder, and a restricted passage is between said closed cylinder and said valve side of said piston so that pressure equalizes therebetween by fluid flow through said restricted passage.

11. A pressure booster for use with a pressure sensitive device for controlling a compressible fluid, said pressure booster comprising:

a cylinder having a head;

a piston slidably movable within said cylinder, without a seal between said piston and said cylinder, said piston having a head end facing into said cylinder to provide a head end space therebetween and having a valve end facing out of said cylinder, a restricted fluid passage between said piston and said cylinder and between said head end space and said valve end, said head end space of said cylinder being closed except for said restricted flow passage;

an orifice adjacent said cylinder;

a valve stem attached to the valve side of said piston and carrying a land adjacent said orifice so that when said piston is positioned away from said head end of said cylinder said land is away from said orifice and when said piston moves away from said orifice toward said head end of said cylinder, said land is positioned to restrict flow through said orifice;

a flow passage for flow under pressure adjacent the valve end of said piston with said valve spool reducing the area on which flow pressure can act on the valve end of said piston to an area less than the head end area of said piston facing said head end space which allows the compressible fluid within said space to be compressed so that upon a surge of pressure in said flow passage with respect to prior pressure said piston moves said land to restrict flow out of said orifice without the need for any dampening movement of said piston and upon substantial equalization of pressure across said piston by fluid flow through said restricted fluid passage said piston automatically moves to a position wherein said land provides less restriction to flow out of said orifice without requiring change in pressure in the flow passage and without the necessity of spring bias of said piston in said cylinder in either direction of piston motion.

12. The pressure booster of claim 11 wherein said cylinder is a closed-bottom cup and said flow passage is in a cap on said cup.

13. The pressure booster of claim 12 wherein said orifice is in said cap.

14. The pressure booster of claim 11 wherein the restricted flow passage past said piston is between said piston and said cylinder.

15. The pressure booster of claim 14 wherein said pressure-sensitive device is a fill valve responsive to liquid level.

* * * * *